(12) United States Patent
Hosoya

(10) Patent No.: US 10,118,567 B2
(45) Date of Patent: Nov. 6, 2018

(54) SADDLE-RIDE-TYPE VEHICLE

(71) Applicant: HONDA MOTOR CO., LTD., Tokyo (JP)

(72) Inventor: Kyohei Hosoya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 15/054,468

(22) Filed: Feb. 26, 2016

(65) Prior Publication Data

US 2016/0272127 A1 Sep. 22, 2016

(30) Foreign Application Priority Data

Mar. 20, 2015 (JP) ................................. 2015-057058

(51) Int. Cl.
| | |
|---|---|
| *B62J 17/00* | (2006.01) |
| *B60R 13/00* | (2006.01) |
| *B62K 11/04* | (2006.01) |
| *B62K 19/48* | (2006.01) |
| *B62K 17/00* | (2006.01) |

(52) U.S. Cl.
CPC ............... *B60R 13/00* (2013.01); *B62J 17/00* (2013.01); *B62K 11/04* (2013.01); *B62K 17/00* (2013.01); *B62K 19/48* (2013.01)

(58) Field of Classification Search
CPC ........... B62J 23/00; B62J 17/00; B62K 11/04; B62K 19/48
See application file for complete search history.

(56) References Cited

U.S. PATENT DOCUMENTS

| | | |
|---|---|---|
| 2006/0066126 A1 | 3/2006 | Ohzono |
| 2007/0205631 A1 | 9/2007 | Nobuhira et al. |
| 2010/0001551 A1 | 1/2010 | Fukuyama et al. |
| 2012/0043150 A1 | 2/2012 | Miyazaki et al. |
| 2013/0313034 A1 | 11/2013 | Matsushima et al. |

FOREIGN PATENT DOCUMENTS

| | | |
|---|---|---|
| CA | 2807024 C | 1/2015 |
| CN | 102582725 A | 7/2012 |
| EP | 2639443 A1 | 9/2013 |
| JP | 11-59534 A | 3/1999 |
| JP | 2002-321676 A | 11/2002 |
| JP | 2010-64579 A | 3/2010 |
| JP | 2011-183954 A | 9/2011 |
| WO | WO 2011/111651 A1 | 9/2011 |

*Primary Examiner* — Katy M Ebner
(74) *Attorney, Agent, or Firm* — Birch, Stewart, Kolasch & Birch, LLP

(57) ABSTRACT

A saddle-ride-type vehicle having a side cover for enhancing the assembling property and external appearance. In a motorcycle including a side cover which has an upper side cover and a lower side cover in a state where an end portion of the upper side cover and an end portion of the lower side cover overlap with each other, the side cover has a joining portion formed by making the upper side cover overlap with an outer side of the lower side cover. A holding portion is formed by making the lower side cover overlap with an outer side of the upper side cover. A fixing portion is provided where the upper side cover and the lower side cover are made to overlap with each other in the same overlapping state as the joining portion is disposed in the vicinity of the joining portion.

20 Claims, 12 Drawing Sheets

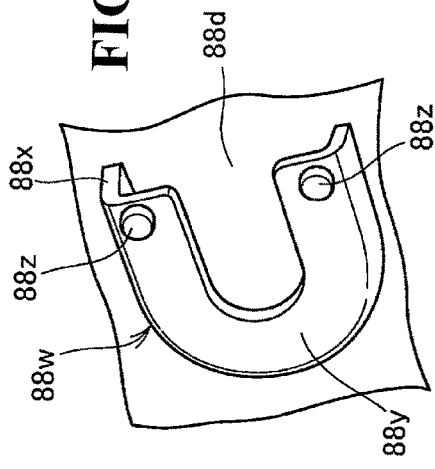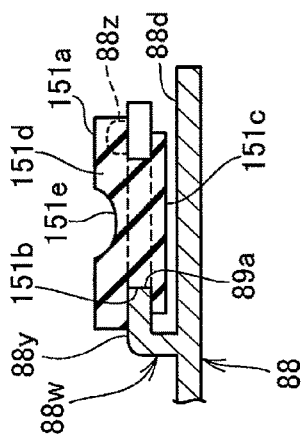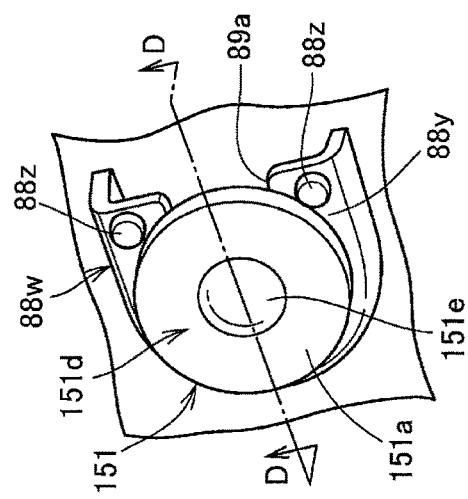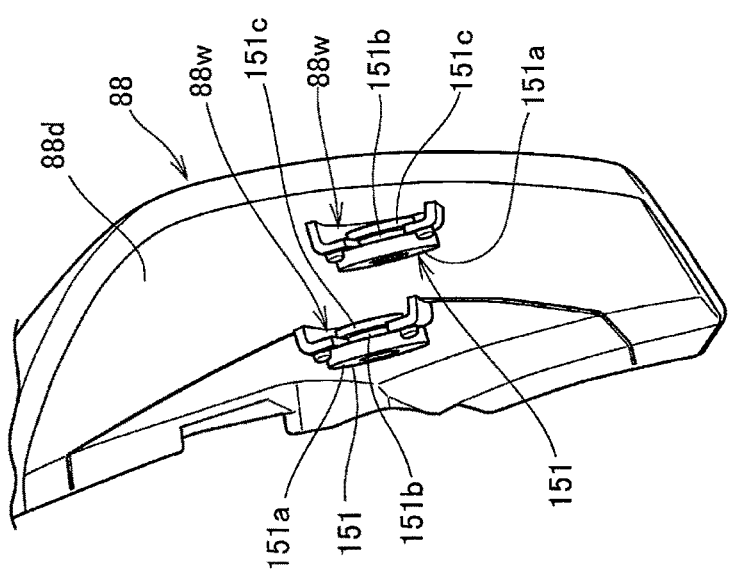

SADDLE-RIDE-TYPE VEHICLE

CROSS-REFERENCE TO RELATED APPLICATIONS

The present application claims priority under 35 USC 119 to Japanese Patent Application No. 2015-057058 filed Mar. 20, 2015 the entire contents of which are hereby incorporated by reference.

BACKGROUND OF THE INVENTION

1. Field of the Invention

The present invention relates to a saddle-ride-type vehicle equipped with a side cover split in two.

2. Description of Background Art

A technique is known wherein a front side cover and a rear side cover are integrally joined to each other by bolts. An assembling operation is facilitated by engaging a rear end portion of the front side cover and a front end portion of the rear side cover. See, for example, JP-A-2011-183954.

In JP-A-2011-183954, when integrally joining the front cover and the rear cover to each other, upper connecting portions are fastened to each other by the bolts and lower connecting portions are fastened to each other by different bolts. Accordingly, the number of steps of the operation, the cost and the weight are increased. Further, the number of fastening portions is large. Thus, there exists a possibility that a mating step is generated between the parts because of a defective fastening thus giving rise to a possibility that movability of a rider in the longitudinal direction of a vehicle and external appearance quality of the vehicle are lowered.

SUMMARY AND OBJECTS OF THE INVENTION

It is an object of an embodiment of the present invention to provide a saddle-ride-type vehicle having a side cover for enhancing the assembling property and external appearance thereof with a simple constitution.

To overcome the above-mentioned problem, according to an embodiment of the present invention a saddle-ride-type vehicle includes a side cover (63) which has a first cover member (78) and a second cover member (88) in a state where an end portion of the first cover member (78) and an end portion of the second cover member (88) overlap with each other. The side cover (63) has a joining portion (63c) formed by making the first cover member (78) overlap with an outer side of the second cover member (88). A holding portion (63a) is formed by making the second cover member (88) overlap with an outer side of the first cover member (78). A fixing portion (63b) is provided where the first cover member (78) and the second cover member (88) are made to overlap with each other in the same overlapping state as the joining portion (63c) is disposed in the vicinity of the joining portion (63c).

According to an embodiment of the present invention, the joining portion (63c) may be provided to one longitudinal end portion of the first cover member (78) and one longitudinal end portion of the second cover member (88). The holding portion (63a) may be provided to the other longitudinal end portion of the first cover member (78) and the other longitudinal end portion of the second cover member (88).

According to an embodiment of the present invention, the second cover member (88) may have a mounting portion (89d) for a vehicle body wherein the mounting portion (89d) of the second cover member (88) may be disposed in the vicinity of the holding portion (63a).

According to an embodiment of the present invention, the first cover member (78) may have a mounting portion (78v) for a vehicle body, the second cover member (88) may have a mounting portion (89d) for the vehicle body wherein the mounting portion (89d) of the second cover member (88) may be disposed further outside in a vehicle width direction relative to the positioning of the mounting portion (78v) of the first cover member (78).

According to an embodiment of the present invention, the joining portion (63c) may be disposed in the vicinity of an imaginary line (190) for connecting a seat (17) and a step (87) to each other.

According to an embodiment of the present invention, an outer surface of the joining portion (63c) may be formed of a continuous surface.

According to an embodiment of the present invention, the holding portion (63a) may be configured such that a width of the holding portion (63a) is increased as the holding portion (63a) extends toward a rear side in the longitudinal direction of the vehicle as viewed in a plan view.

According to an embodiment of the present invention, an air introducing opening (78m) may be formed in the first cover member (78), an air cleaner element (167) may be disposed in the inside of a vehicle body which communicates with the air introducing opening (78m), and the air introducing opening (78m) may be directed toward a rear side of the air cleaner element (167).

The side cover of an embodiment of the present invention has the joining portion formed by making the first cover member overlap with the outer side of the second cover member, and the holding portion formed by making the second cover member overlap with the outer side of the first cover member, and the fixing portion where the first cover member and the second cover member are made to overlap with each other in the same overlapping state as the joining portion is disposed in the vicinity of the joining portion. Accordingly, the fixing portion disposed in the vicinity of the joining portion is fixed using a joining force generated in the joining portion, and the first cover member can be held by making use of a holding force generated by the joining portion and the fixing portion at the holding portion. Thus, in the holding portion, the cover members can be fixed to each other without joining both cover members to each other.

Accordingly, the first cover member and the second cover member can be assembled with a high accuracy while improving assembling property with a simple structure. As a result, a gap is minimally formed between the first cover member and the second cover member. Thus, the external appearance can be enhanced.

The joining portion is provided to one longitudinal end portion of the first cover member and one longitudinal end portion of the second cover member, and the holding portion is provided to the other longitudinal end portion of the first cover member and the other longitudinal end portion of the second cover member. Accordingly, the joining portion and the holding portion are provided to both end portions of the first cover member and the second cover member to be joined to each other. Thus, a joining strength between the first cover member and the second cover member can be enhanced.

The second cover member has a mounting portion for a vehicle body, and the mounting portion of the second cover member is disposed in the vicinity of the holding portion.

Accordingly, the holding portion of the side cover can be pressed to a vehicle body side by making use of a force for mounting the side cover to the vehicle body. Thus, a holding force for holding the first cover member can be increased.

The first cover member has the mounting portion for the vehicle body, the second cover member has the mounting portion for the vehicle body, and the mounting portion of the second cover member is disposed further outside in a vehicle width direction relative to the positioning of the mounting portion of the first cover member. Accordingly, in mounting the second cover member on the vehicle body at the mounting portion thereof, the mounting portion of the second cover member can be fastened while taking into account a moving amount generated along with a fastening amount of the mounting portion of the first cover member. Thus, the formation of a gap between the first cover member and the second cover member can be suppressed.

The joining portion is disposed in the vicinity of an imaginary line which connects the seat and the step to each other. Accordingly, a joining strength of a portion of the side cover with which a leg portion of a rider is brought into contact can be increased.

The outer surface of the joining portion is formed of a continuous surface. Thus, the side cover does not obstruct the movement of a leg portion of a rider whereby the rider can smoothly change a riding posture.

The holding portion is configured such that a width of the holing portion is increased as viewed in a plan view as the holding portion extends toward a rear side in the longitudinal direction of the vehicle. Accordingly, a modulus of section of the holding portion is increased as the holding portion extends toward a rear side in the longitudinal direction of the vehicle. Thus, it is possible to compensate for a holding force which is lowered as the holding portion is disposed away from the fixing portion.

The air introducing opening is formed in the first cover member, the air cleaner element is disposed in the inside of the vehicle body which communicates with the air introducing opening, and the air introducing opening is directed toward a rear side of the air cleaner element. Accordingly, it is possible to suppress muddy water, soil, dust or the like which is mixed into air taken into the inside of the cover member through the air introducing opening from being caught by the air cleaner element, and also air can be supplied to the rear side of the air cleaner element. Thus, a suction efficiency of the air cleaner can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(A) and 7(B) illustrate explanatory views showing the lower side cover, wherein FIG. 7(A) is a right side view of the lower side cover, and FIG. 7(B) is a plan view of the lower side cover;

FIGS. 8(A), 8(B), 8(C) and 8(D) illustrate explanatory views for explaining a back surface side of the lower side cover, wherein FIG. 8(A) is a perspective view showing a back surface side of the lower side cover, FIG. 8(B) is a perspective view showing a rubber mounting portion disposed on a back surface of the lower side cover, FIG. 8(C) is a perspective view showing the rubber mounting portion on which a rubber member is mounted, and FIG. 8(D) is a cross-sectional view taken along a line D-D in FIG. 8(C);

FIGS. 9(A), 9(B), 9(C) and 9(D) illustrate explanatory views for explaining the assembling of the side cover, wherein FIG. 9(A) is an operational view showing the steps of assembling the upper side cover and the lower side cover to each other, FIG. 9(B) is a right side view showing a temporarily assembled state of the side cover, FIG. 9(C) is a cross-sectional view taken along a line C-C in FIG. 9(B), and FIG. 9(D) is a cross-sectional view taken along a line D-D in FIG. 9(B);

DETAILED DESCRIPTION OF THE PREFERRED EMBODIMENTS

Hereinafter, one embodiment of the invention is explained with reference to drawings. In the explanation, directions such as "front," "rear," "left," "right," "up" and "down" are equal to the directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
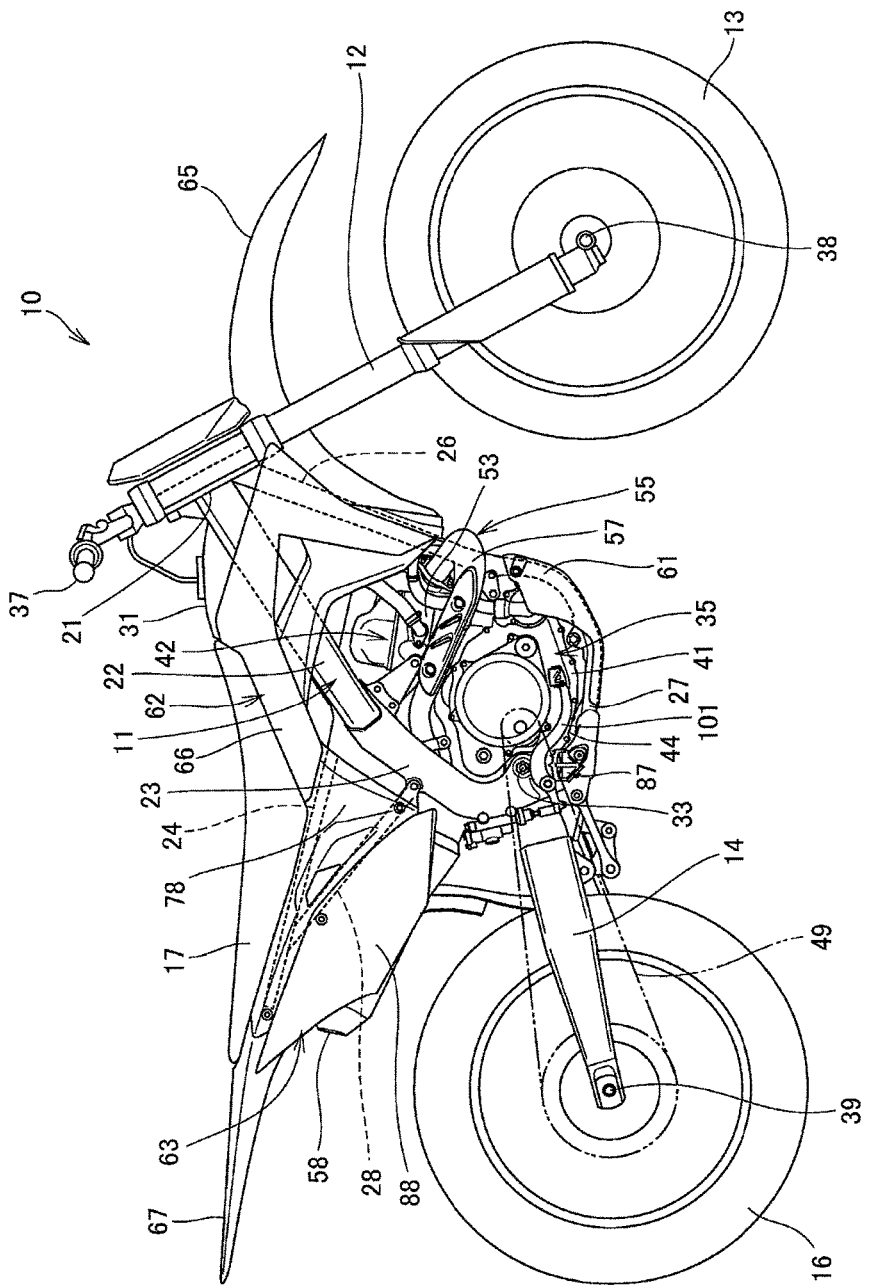
FIG. 1 is a right side view showing a motorcycle according to the invention.

FIG. 1 is a right side view showing a motorcycle 10 according to the invention.

The motorcycle 10 includes a front wheel 13 supported on a front end portion of a vehicle body frame 11 by way of a front fork 12; a rear wheel 16 supported on a rear lower portion of the vehicle body frame 11 by way of a swing arm 14; and a seat 17 supported on an upper portion of the vehicle body frame 11. As described above, the motorcycle 10 is a saddle-ride-type vehicle where a rider rides on the vehicle in a state where the rider straddles the seat 17.

The vehicle body frame 11 includes a head pipe 21; a pair of left and right main frames 22; a pair of left and right center frames 23; a pair of left and right seat frames 24; a down frame 26; a pair of left and right lower frames 27; and a pair of left and right sub frames 28.

The head pipe 21 constitutes a front end portion of the vehicle body frame 11, and supports the front fork 12 in a steerable manner. The main frames 22 extend obliquely rearwardly and downwardly from an upper portion of the head pipe 21, and support the seat 17 and a fuel tank 31 which is arranged in front of the seat 17. The center frames 23 extend obliquely rearwardly and downwardly from rear end portions of the main frames 22 and further extend substantially downwardly respectively. A pivot shaft 33 for supporting a front end portion of the swing arm 14 in a swingable manner extends between the left and right center frames 23.

The seat frames 24 extend obliquely rearwardly and upwardly from upper end portions of the left and right center frames 23, respectively, and support the seat 17. The down frame 26 extends substantially downwardly from a lower portion of the head pipe 21. The left and right lower frames 27 extend in the leftward and downward direction and in the rightward and downward direction from a lower end portion of the down frame 26, respectively, further extend rearwardly, respectively, and are connected to lower end portions of the left and right center frames 23, respectively. The sub frames 28 extend obliquely rearwardly and upwardly from upper portions of the left and right center frames 23 below the left and right seat frames 24 respectively, and are connected to rear portions of the seat frames 24 respectively.

An engine 35 is supported on the above-mentioned left and right center frames 23, the down frame 26, and left and right lower frames 27.

The front fork 12 supports a bar handle 37 on an upper end portion thereof, and supports the front wheel 13 on a lower end portion thereof by way of a front axle 38. The swing arm 14 supports the rear wheel 16 on a rear end portion thereof by way of a rear axle 39.

The engine 35 includes a crankcase 41, and a cylinder portion 42 which extends upwardly from a front upper portion of the crankcase 41.

A transmission 44 is integrally mounted on a rear portion of the crankcase 41.

The cylinder portion 42 includes a cylinder head 53, an intake device 54 (see FIG. 2) is connected to a rear portion of the cylinder head 53, and an exhaust device 55 is connected to a front portion of the cylinder head 53. The exhaust device 55 includes an exhaust pipe 57 which is connected to the cylinder head 53 and a muffler 58 which is connected to a rear end portion of the exhaust pipe 57.

An engine guard 61 for covering the engine 35, the left and right lower frames 27 and the like from a front side and below is arranged on a front lower portion of the vehicle body.

The vehicle body frame 11 is covered by a vehicle body cover 62. The vehicle body cover 62 includes a pair of left and right shrouds 66 for covering the main frames 22 and the down frame 26 from sides, respectively; and a pair of left and right side covers 63 for covering the seat frames 24 and the sub frames 28 from sides, respectively.

In the drawings, a chain 49 for transmitting power to the rear wheel 16 from the transmission 44 is provided. A front fender 65 covers the front wheel 13 from above and a rear fender 67 covers the rear wheel 16 from above. A step 87 for a rider is provided together with a brake pedal 101.

Figure 2:
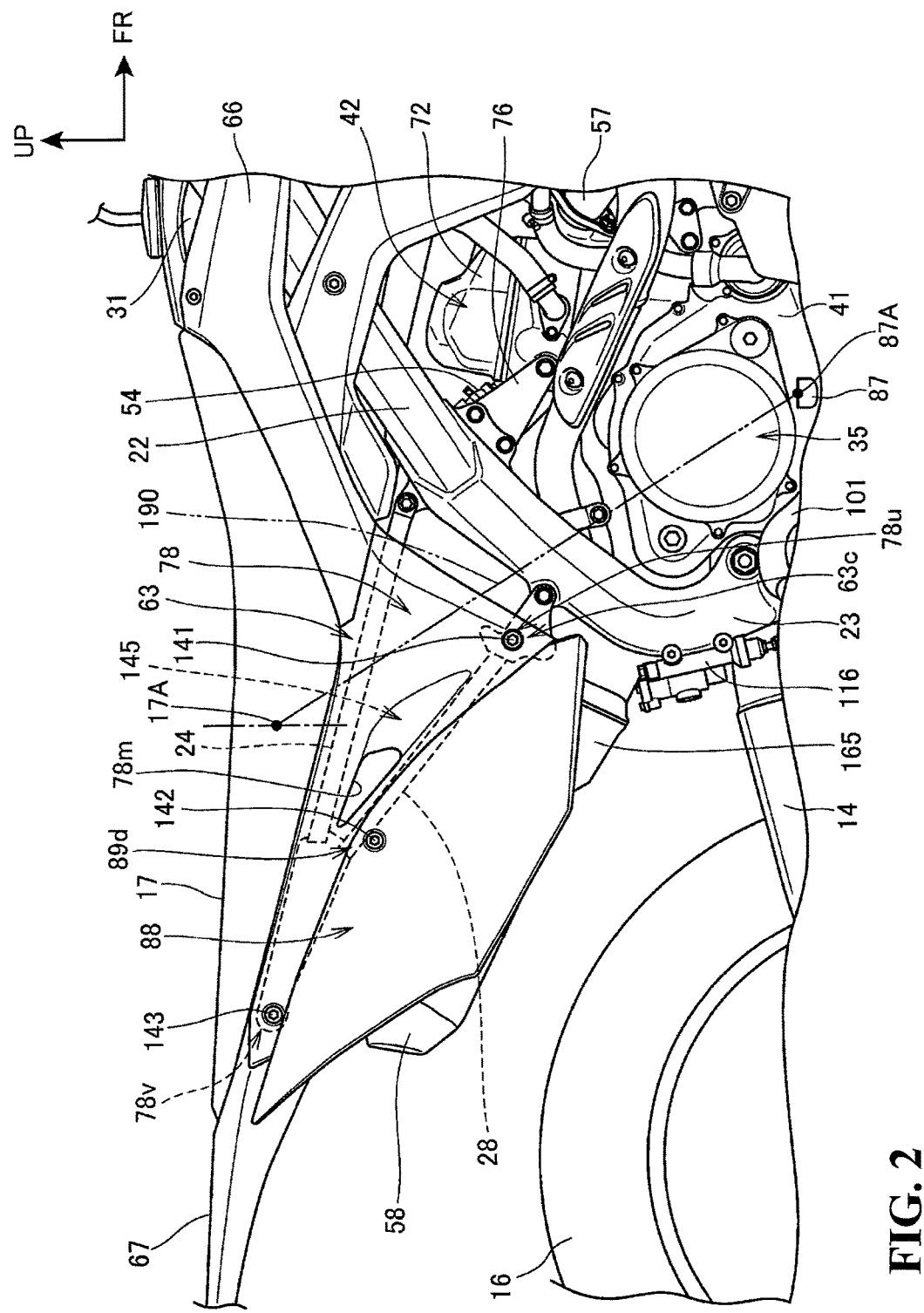
FIG. 2 is a right side view showing a rear portion of the motorcycle.

FIG. 2 is a right side view showing a rear portion of the motorcycle 10.

The side cover 63 is constituted of an upper side cover 78 which constitutes an upper portion of the side cover 63, and a lower side cover 88 which constitutes a lower portion of the side cover 63. The upper side cover 78 and the lower side cover 88 are parts arranged adjacent to each other in the vertical direction. Bolts 141, 142, 143 are provided for fixing the side cover 63 to the seat frame 24, the sub frame 28 and the like.

The upper side cover 78 is a resin-made part having an approximately triangular shape for covering a triangular space 145 surrounded by the center frame 23, the seat frame 24 and the sub frame 28 from the side together with the seat frame 24 and the sub frame 28.

The lower side cover 88 is a resin-made part having a pointed front end and a pointed rear end for covering the muffler 58 arranged behind the center frame 23 from the side.

As described above, by splitting the side cover 63 vertically into the upper side cover 78 and the lower side cover 88, the upper side cover 78 and the lower side cover 88 can be formed by resins of different colors, the degree of freedom in determining shapes of the respective side covers can be increased, and the respective side covers can be easily mounted, removed or exchanged at the time of frequently mounting or removing the respective side covers.

A head cover 72 is provided for covering an opening formed in an upper portion of the cylinder head 53, and constitutes a portion of the cylinder portion 42. An engine hanger 76 supports the cylinder portion 42, and a master cylinder 116 generates a hydraulic pressure when the brake pedal 101 is operated.

Figure 3:
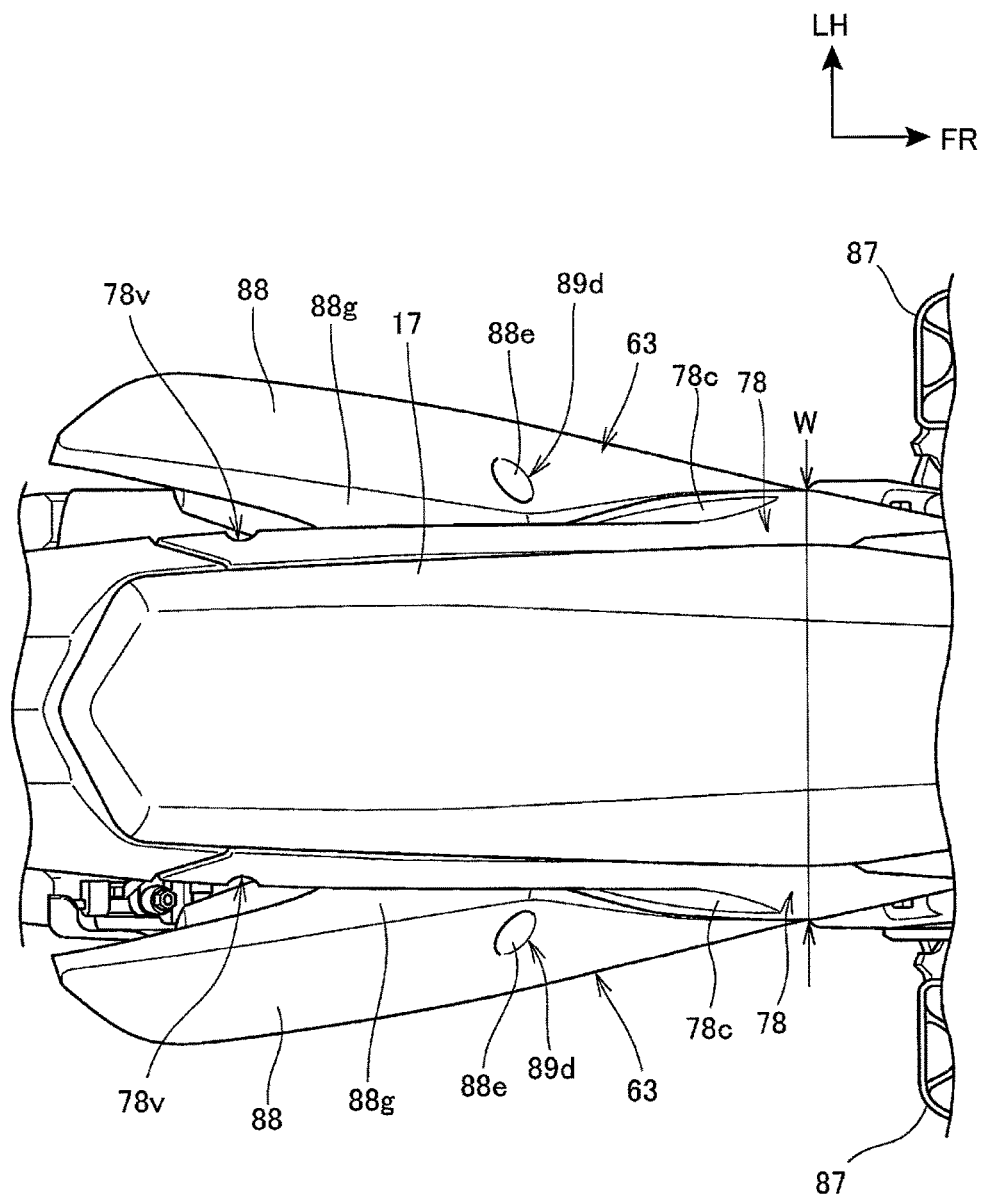
FIG. 3 is a plan view showing left and right side covers and the surroundings of the left and right side covers.

FIG. 3 is a plan view showing the left and right side covers 63, 63 and the surroundings of the side covers 63, 63.

The upper side cover 78 of the side cover 63 extends in the longitudinal direction of the vehicle along a side edge of the seat 17. The lower side cover 88 is formed so as to gradually expand outwardly in the vehicle width direction as the lower side cover 88 extends toward a rear side in the longitudinal direction of the vehicle, and a rear end portion of the lower side cover 88 extends further rearwardly relative to a rear end portion of the upper side cover 78 and is gradually separated or spaced apart from the upper side cover 78, and extends to the substantially same position as a rear end portion of the seat 17 in the longitudinal direction.

A width W in the vehicle width direction between front portions of the respective left and right lower side covers 88, 88 is set narrower than a width W in the vehicle width direction between rear portions of the respective left and right lower side covers 88, 88. Thus, there is no possibility that the left and right lower side covers 88, 88 interfere with legs of a rider seated on the seat 17.

Figure 4:
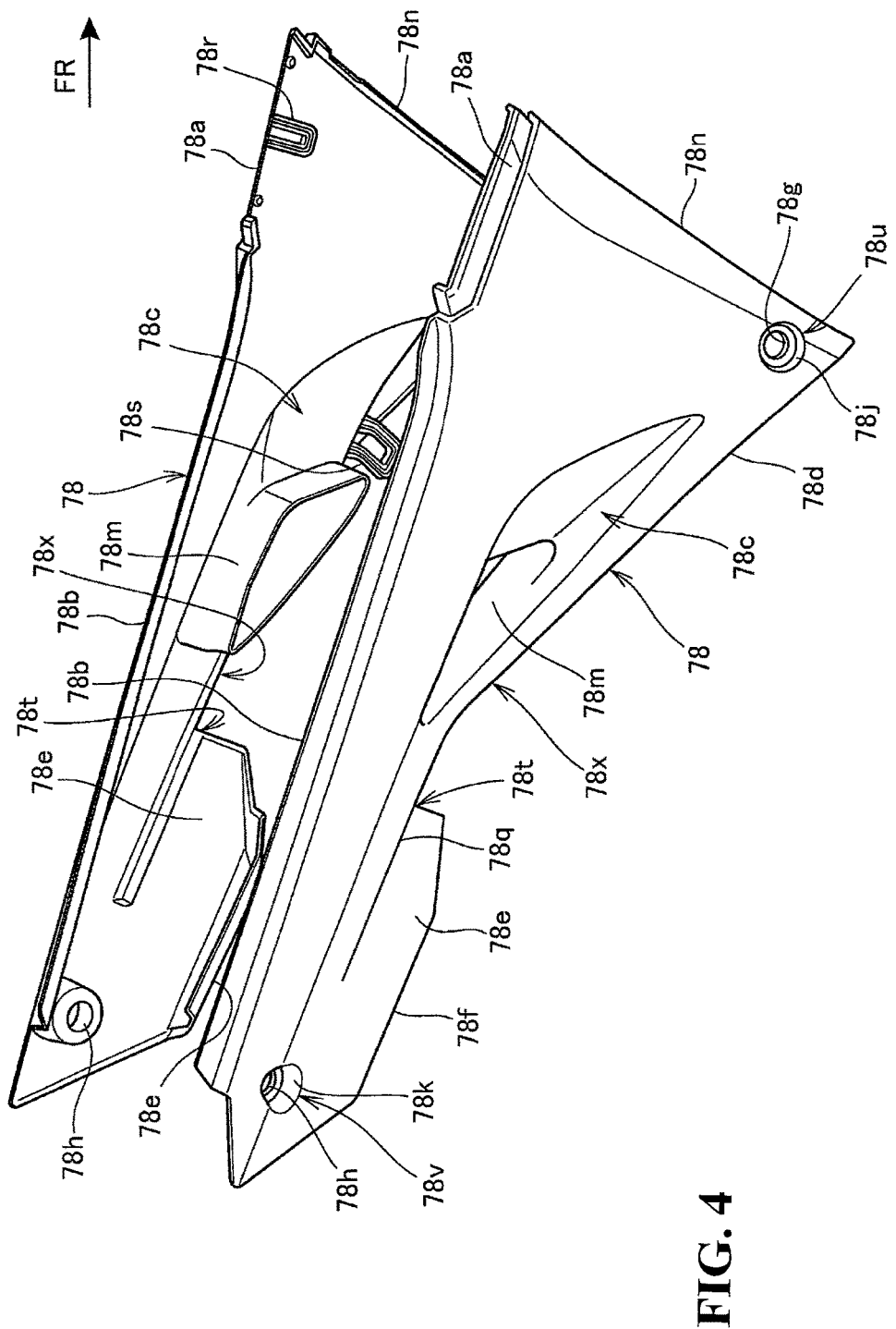
FIG. 4 is a perspective view showing left and right upper side covers.

FIG. 4 is a perspective view showing the left and right upper side covers 78, 78.

The upper side cover 78 includes a shroud-side upper edge portion 78a; a seat-side upper edge portion 78b; an intermediate recessed portion 78c; a front lower edge portion 78d; a downwardly projecting portion 78e; a rear lower edge portion 78f; and bolt insertion holes 78g, 78h.

The shroud-side upper edge portion 78a is a portion to be fitted on a rear end portion of the shroud 66 (see FIG. 2). The seat-side upper edge portion 78b is a portion to be inserted into the inside of a lower edge portion of the seat 17 (see FIG. 2). The intermediate recessed portion 78c is a portion having an approximately triangular shape formed in an intermediate portion of the upper side cover 78 in the longitudinal direction of the vehicle, and an air introducing opening 78m through which air is introduced into the inside of the vehicle body is formed in a rear portion of the intermediate recessed portion 78c.

The front lower edge portion 78d extends from a front edge 78n of the upper side cover 78 to an area in the vicinity of a rear end of the air introducing opening 78m (to an area behind the rear end of the air introducing opening 78*m*). The downwardly projecting portion 78*e* is formed on a rear lower portion of the upper side cover 78 such that the downwardly projecting portion 78*e* projects downwardly from a rear end of the front lower edge portion 78*d*. The rear lower edge portion 78*f* forms a lower edge of the downwardly projecting portion 78*e*. The front lower edge portion 78*d* and the downwardly projecting portion 78*e* constitute a lower edge portion fitting portion 78*x*, and are portions to be fitted on an upper edge portion 88*a* (see FIG. 6) of the lower side cover 88 (see FIG. 6).

The bolt insertion holes 78*g*, 78*h* are portions which allow bolts 141, 143 (see FIG. 2) for fixing the upper side cover 78 to the seat frame 24 (see FIG. 2) and the sub frame 28 (see FIG. 2) to pass therethrough respectively. Recessed portions 78*j*, 78*k* where head portions of the bolts 141, 143 are arranged are formed on edge portions of the bolt insertion holes 78*g*, 78*h* respectively.

The bolt insertion hole 78*g* and the recessed portion 78*j* constitute an upper cover joining portion 78*u*. Further, the bolt insertion hole 78*h* and the recessed portion 78*k* constitute an upper cover mounting portion 78*v*.

Figure 5:
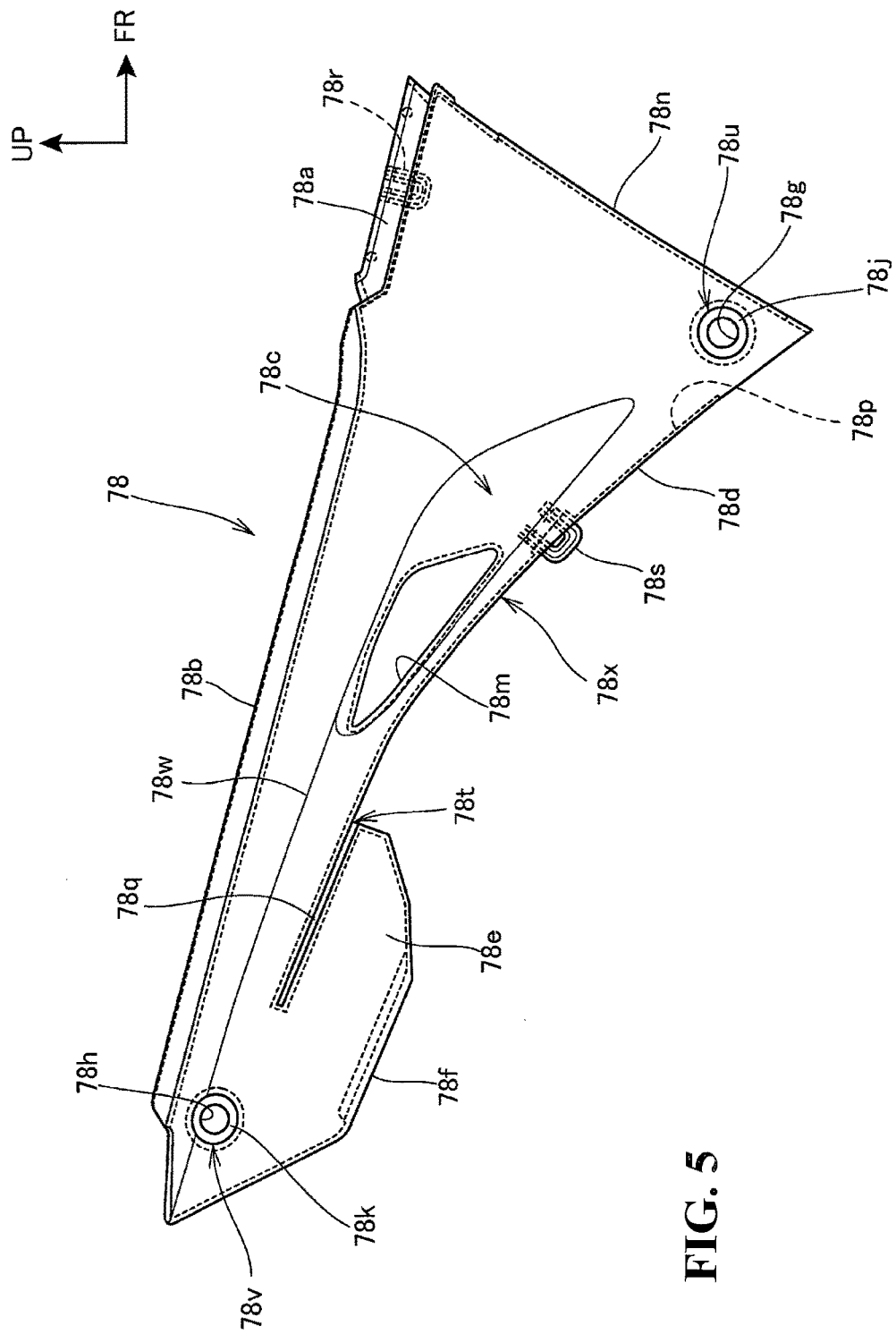
FIG. 5 is a right side view showing the upper side cover.

FIG. 5 is a right side view showing the upper side cover 78.

The front lower edge portion 78*d* of the upper side cover 78 extends obliquely rearwardly and upwardly from a lower end of the front edge 78*n* of the upper side cover 78 while being gently bent in an upwardly bent convex shape.

Figure 9A:
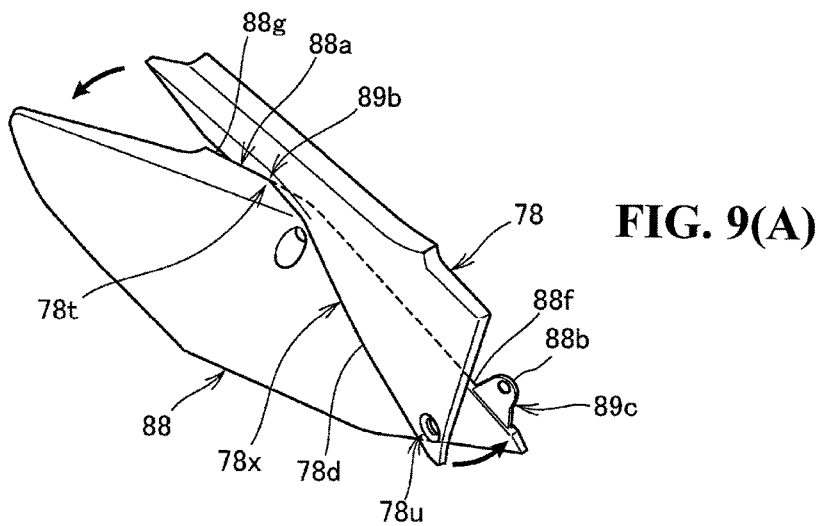
Figure 9B:
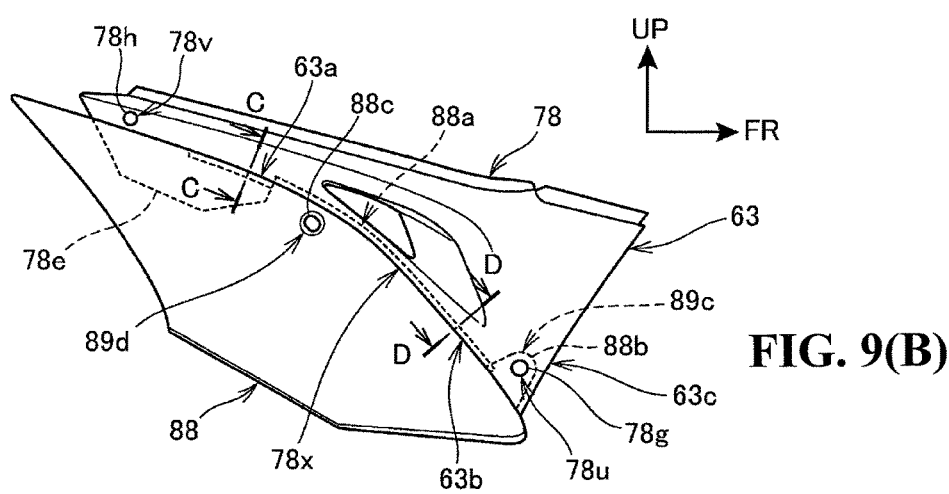
Figures 9C, 9D:
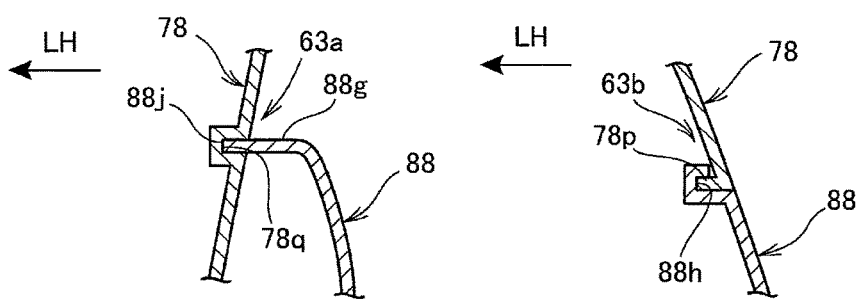

A projecting ridge portion 78*p* (see also FIG. 9(D)) extends to a front end of the downwardly projecting portion 78*e* from a position away from the front edge 78*n*, more specifically, an area in the vicinity of the bolt insertion hole 78*g* and projects toward the inside of the vehicle body is integrally formed on the front lower edge portion 78*d*.

A rear groove portion 78*q* is recessed toward the inside of the vehicle body and is formed on the downwardly projecting portion 78*e* on an extension of the front lower edge portion 78*d* so as to extend substantially linearly in the obliquely rearward and upward direction.

The rear end portion of the front lower edge portion 78*d* and the upper end of the downwardly projecting portion 78*e* form an upper cover corner portion 78*t*.

The rear portion of the upper side cover 78 including the downwardly projecting portion 78*e* and the upper cover mounting portion 78*v* is a portion for covering a mounting portion of the rear fender 67 (see FIG. 10) on the seat frame 24 (see FIG. 10) and the surrounding of the mounting portion from the side.

A ridge line 78*w* is formed in an extending manner from the periphery of the intermediate recessed portion 78*c* of the upper side cover 78 to the rear end portion of the upper side cover 78. The ridge line 78*w* is divided in the longitudinal direction by the recessed portion 78*k*.

Engaging portions 78*r*, 78*s* are formed into a hook shape for engaging the upper side cover 78 with the seat frame 24 (see FIG. 2) and the sub frame 28 (see FIG. 2), respectively.

Figure 6:
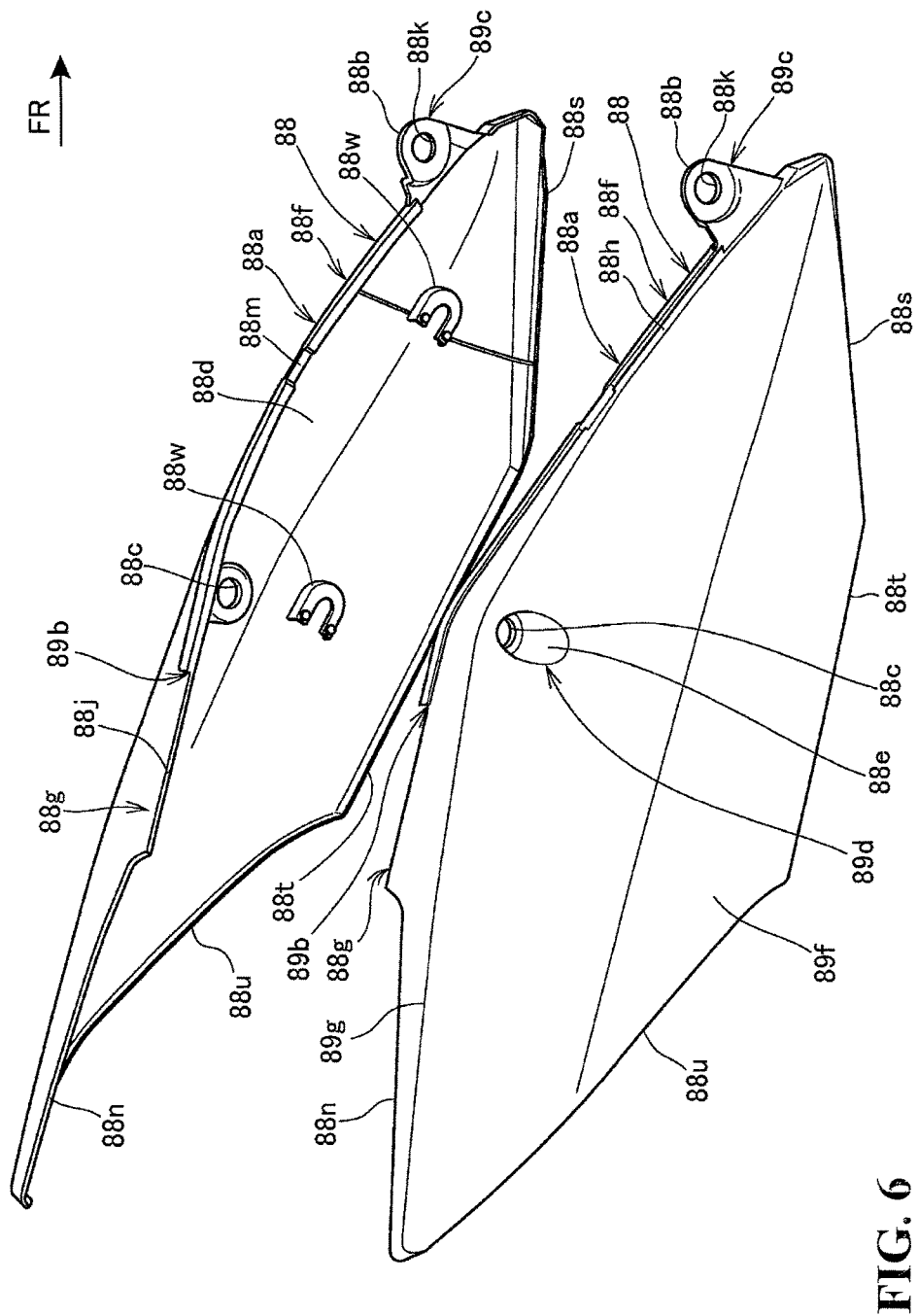
FIG. 6 is a perspective view showing left and right lower; side covers.

FIG. 6 is a perspective view showing the left and right lower side covers 88, 88.

The lower side cover 88 includes an upper edge portion 88*a*; a front end projecting portion 88*b*; a bolt insertion hole 88*c*; and a plurality of rubber mounting portions 88*w*, 88*w*.

The upper edge portion 88*a* is a portion to be fitted in the lower edge of the upper side cover 78 (see FIG. 4), and includes an upper edge portion front portion 88*f* which constitutes a front portion of the upper edge portion 88*a*, and an upper edge portion rear portion 88*g* which constitutes a rear portion of the upper edge portion 88*a*. The upper edge portion front portion 88*f* and the upper edge portion rear portion 88*g* are continuously formed in the longitudinal direction. A rear end of the upper edge portion front portion 88*f* is positioned behind a lower cover mounting portion 89*d* described in detail later.

A ridge line 89*g* extends from a front end portion to a rear end portion of the lower side cover 88 and is formed between the upper edge portion 88*a* and an outer surface 89*f* which is formed in an outwardly projecting manner in the vehicle width direction. The ridge line 89*g* is bent in an upwardly bent convex shape above the lower cover mounting portion 89*d*.

An upper edge portion groove portion 88*h* opens outwardly in the vehicle width direction and is formed on the upper edge portion front portion 88*f*. The upper edge portion rear portion 88*g* is a portion having an approximately flat shape, and includes a rear portion end surface 88*j* which faces the inside in the vehicle width direction and extends linearly in the longitudinal direction of the vehicle.

The front end projecting portion 88*b* is formed on a front end portion of the upper edge portion 88*a* in an upwardly projecting manner.

A bolt insertion hole 88*k* for allowing the same bolt 141 (see FIG. 2) passing through the bolt insertion hole 78*g* (see FIG. 4) formed in the upper side cover 78 (see FIG. 4) to pass therethrough is formed in the front end projecting portion 88*b*. A front end portion lower portion of the upper side cover 78 and the front end projecting portion 88*b* are fastened together by the bolt 141.

The above-mentioned front end projecting portion 88*b* and the bolt insertion hole 88*k* constitute a lower cover joining portion 89*c*.

The bolt insertion hole 88*c* is a portion formed in an upper portion of a center portion of the lower side cover 88 in the longitudinal direction and allows the bolt 142 (see FIG. 2) to pass therethrough. The recessed portion 88*e* is formed on an edge portion of the bolt insertion hole 88*c*. The recessed portion 88*e* and the bolt insertion hole 88*c* constitute the lower cover mounting portion 89*d*.

The rubber mounting portions 88*w* are formed on a back surface 88*d* of the lower side cover 88, and a rubber member 151 (see FIG. 8(C)) described later is fitted in the rubber mounting portion 88*w*.

Figure 7A:
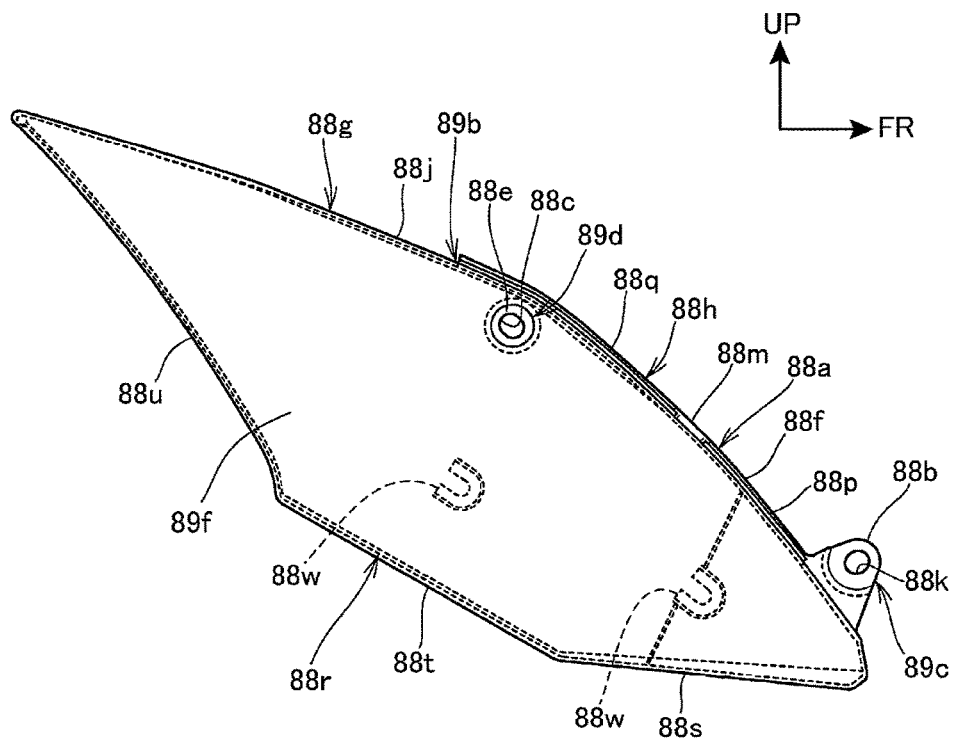
Figure 7B:
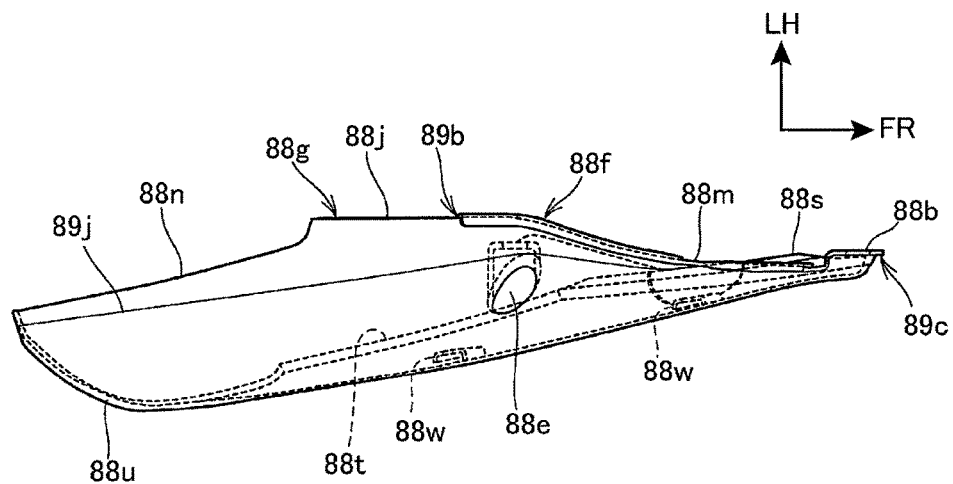

FIG. 7(A) and FIG. 7(B) are explanatory views showing the lower side cover 88. FIG. 7(A) is a right side view of the lower side cover 88, and FIG. 7(B) is a plan view of the lower side cover 88.

As shown in FIG. 7(A), the upper edge portion front portion 88*f* extends obliquely rearwardly and upwardly from a root portion of the front end projecting portion 88*b* to an area behind the lower cover mounting portion 89*d* and in the vicinity of the lower cover mounting portion 89*d* while being gently bent in an upwardly bent convex shape.

The upper edge portion groove portion 88*h* has an intermediate portion thereof separated into a front-side front groove 88*p* and a rear-side rear groove 88*q* with a recessed portion 88*m* formed on an inner surface thereof in the vehicle width direction as a boundary therebetween. A lower surface of the upper edge portion groove portion 88*h* of the upper edge portion front portion 88*f* and an upper surface of the upper edge portion rear portion 88*g* are continuously formed with each other.

A lower edge portion 88*r* of the lower side cover 88 includes a lower edge portion front portion 88*s* extending substantially horizontally in the rearward direction from a lower side of the front end projecting portion 88*b*; an intermediate portion lower edge portion 88*t* extending linearly in the obliquely rearward and upward direction from a rear end of the lower edge portion front portion 88s; and a lower edge portion rear portion 88u extending in the obliquely upward and rearward direction from a rear end of the intermediate portion lower edge portion 88t while being bent in an upwardly bent convex shape.

The rubber mounting portion 88w having a U shape as viewed in a side view is formed on a back surface of the lower side cover 88 at a position behind the front end projecting portion 88b and at a position below the bolt insertion hole 88c in a state where an open side of the U shape is directed in the obliquely rearward and upward direction. The rubber mounting portion 88w is a portion on which the rubber member 151 (see FIG. 8(C)) is to be mounted. The rubber member 151 is mounted on the lower side cover 88 at a position where the rubber member 151 faces the muffler 58 (see FIG. 2) positioned inside the lower side cover 88 in the vehicle width direction in an opposed manner.

As shown in FIG. 7(B), a portion of the upper edge portion front portion 88f in front of the recessed portion 88m extends in the longitudinal direction, and a portion of the upper edge portion front portion 88f behind the recessed portion 88m extends obliquely rearwardly and inwardly in the vehicle width direction from the recessed portion 88m and, thereafter, extends rearwardly. The upper edge portion rear portion 88g extends rearwardly from a rear end of the upper edge portion front portion 88f.

A rear upper edge portion 88n extends obliquely rearwardly and outwardly in the vehicle width direction from a rear end of the upper edge portion rear portion 88g.

The ridge line 89g which forms an outer edge of the upper edge portion rear portion 88g and an outer edge of the rear upper edge portion 88n extends more outwardly in the vehicle width direction as the ridge line 89g extends rearwardly. With such a configuration, the upper edge portion rear portion 88g which constitutes a holding portion 63a has a width thereof gradually increased in the vehicle width direction as the upper edge portion rear portion 88g extends rearwardly.

The lower edge portion front portion 88s extends rearwardly from a front end portion thereof and, thereafter, extends obliquely rearwardly and outwardly in the vehicle width direction. The intermediate portion lower edge portion 88t extends obliquely rearwardly and outwardly in the vehicle width direction from a rear end of the lower edge portion front portion 88s. The lower edge portion rear portion 88u extends rearwardly from a rear end of the intermediate portion lower edge portion 88t in an outwardly bent convex shape in the vehicle width direction. More specifically, the whole lower side cover 88 is bent in an outwardly bent convex shape in the vehicle width direction.

FIG. 8(A) to FIG. 8(D) are explanatory views for explaining the lower side cover 88. FIG. 8(A) is a perspective view showing a back surface 88d side of the lower side cover 88, FIG. 8(B) is a perspective view showing the rubber mounting portions 88w formed on the back surface 88d of the lower side cover 88, FIG. 8(C) is a perspective view showing the rubber mounting portion 88w on which the rubber member 151 is mounted, and FIG. 8(D) is a cross-sectional view taken along a line D-D in FIG. 8(C).

As shown in FIG. 8(A), the plurality of rubber mounting portions 88w are integrally formed on the back surface 88d of the lower side cover 88, and the rubber member 151 is fitted in the rubber mounting portions 88w respectively. An inner surface 151a of the rubber member 151 faces the inside in the vehicle width direction in an opposed manner.

As shown in FIG. 8(B), the rubber mounting portion 88w is an integral body formed of a U-shaped raised wall 88x which is raised from the back surface 88d; a side wall 88y having a U shape which is integrally formed with an inner edge of the raised wall 88x in the vehicle width direction; and a pair of rubber removal preventing projecting portions 88z, 88z which is formed on both end portions of the U-shaped side wall 88y in an inwardly projecting manner in the vehicle width direction.

As shown in FIG. 8(C) and FIG. 8(D), the rubber member 151 is a rubber-made part which is an integral body formed of: an annular fitting groove 151b in which an inner edge portion 89a of the side wall 88y of the rubber mounting portion 88w is fitted; a disc-shaped outer portion 151c which is arranged on a more back surface 88d side than the side wall 88y; and an inner portion 151d which is arranged on a side opposite to the outer portion 151c with respect to the side wall 88y. An indentation 151e is formed on the inner surface 151a of the inner portion 151d.

A distance between the pair of rubber removal preventing projecting portions 88z, 88z is set smaller than an outer diameter of the inner portion 151d of the rubber member 151. Further, the pair of rubber removal preventing projecting portions 88z, 88z projects inwardly in the vehicle width direction from the side wall 88y. Accordingly, it is possible to prevent the inner portion 151d which projects inwardly in the vehicle width direction from the side wall 88y in the same manner as the pair of rubber removal preventing projecting portions 88z from being removed from the rubber mounting portion 88w. Further, the rubber removal preventing projecting portion 88z is formed not on a back-surface-88d-side surface of the side wall 88y but on the inner surface of the side wall 88y in the vehicle width direction. Accordingly, in forming the lower side cover 88 (see FIG. 8(A)) by resin molding, there arises no problem in removing a molding die and hence, the rubber mounting portion 88w can be easily formed by molding.

The rubber members 151 are parts provided for preventing the side covers 63 from being deflected and interfering with the mufflers 58 (see FIG. 2) when the rider presses the side covers 63 (see FIG. 2) by his left and right leg portions.

Next, the assembling steps of the side cover 63 having the above-mentioned constitution are explained.

FIG. 9(A) to FIG. 9(D) are explanatory views for explaining the assembling steps of the side cover 63. FIG. 9(A) is an operational view showing the step of assembling the upper side cover 78 and the lower side cover 88 to each other, FIG. 9(B) is a right side view showing a temporarily assembled state of the side cover 63, FIG. 9(C) is a cross-sectional view taken along a line C-C in FIG. 9(B), and FIG. 9(D) is a cross-sectional view taken along a line D-D in FIG. 9(B).

In FIG. 9(A), for example, the upper side cover 78 and the lower side cover 88 are arranged in the vertical direction in a state where the upper side cover 78 and the lower side cover 88 are relatively rotated by a predetermined angle (for example, approximately 30° in a horizontal plane.

Then, the upper cover corner portion 78t which is formed of the front lower edge portion 78d and the downwardly projecting portion 78e (see FIG. 9(B)) of the upper side cover 78 is made to overlap with a lower cover corner portion 89b which is formed of the upper edge portion front portion 88f and the upper edge portion rear portion 88g of the lower side cover 88.

Next, the upper side cover 78 and the lower side cover 88 are rotated relative to each other such that end portions of the respective covers approach to each other. As a result, as shown in FIG. 9(B), the lower edge portion fitting portion 78x of the upper side cover 78 and the upper edge portion 88a of the lower side cover 88 engage with each other by fitting engagement so that the upper side cover 78 and the lower side cover 88 are temporarily assembled to each other.

In FIG. 9(A), the upper side cover 78 is rotated as indicated by an arrow while keeping the lower side cover 88 stationary. However, the assembling steps are not limited to such steps, and the lower side cover 88 may be rotated while keeping the upper side cover 78 stationary, or both the upper side cover 78 and the lower side cover 88 may be rotated relative to each other.

As shown in FIG. 9(C), the upper edge portion rear portion 88g of the lower side cover 88 is inserted into the rear groove portion 78q of the upper side cover 78 from the outside in the vehicle width direction. The upper edge portion rear portion 88g and the rear groove portion 78q constitute the holding portion 63a.

As shown in FIG. 9(D), the projecting ridge portion 78p of the upper side cover 78 is inserted into the upper edge portion groove portion 88h of the lower side cover 88 from the outside in the vehicle width direction. The projecting ridge portion 78p and the upper edge portion groove portion 88h constitute a fixing portion 63b.

As shown in FIG. 9(B) to FIG. 9(D), the side cover 63 includes a joining portion 63c and the holding portion 63a.

The joining portion 63c is formed by making the upper cover joining portion 78u of the upper side cover 78 overlap with an outer side of the lower cover joining portion 89c of the lower side cover 88.

The holding portion 63a is formed by making the upper edge portion rear portion 88g of the lower side cover 88 overlap with an outer side of the rear groove portion 78q of the upper side cover 78.

The fixing portion 63b is formed by making the projecting ridge portion 78p of the upper side cover 78 overlap with the upper edge portion groove portion 88h of the lower side cover 88. In the same manner as the joining portion 63c, in the fixing portion 63b, an upper side cover 78 side is made to overlap with a lower side cover 88 side from an outer side of the lower side cover 88, and the fixing portion 63b is positioned in the vicinity of the joining portion 63c.

As shown in FIG. 2, the joining portion 63c is positioned in the vicinity of an imaginary line 190 which connects a point 17A positioned at a center portion of the seat 17 in the longitudinal direction and at a center portion of the seat 17 in the height direction of the seat 17 and a point 87A positioned at a center portion of a foot rest surface of the step for a rider 87 in the longitudinal direction.

In FIG. 3, FIG. 7(B) and FIG. 9(B), the upper edge portion rear portion 88g of the lower side cover 88 which constitutes the holding portion 63a is formed such that a width of the upper edge portion rear portion 88g (that is, a width between the rear portion end surface 88j and the ridge line 89g in the vehicle width direction) is gradually increased as the upper edge portion rear portion 88g extends toward the rear side in the longitudinal direction of the vehicle as viewed in a plan view. With such a configuration, a modulus of section of the holding portion 63a is gradually increased, that is, a rigidity of the holding portion 63a is increased as the holding portion 63a extends toward the rear side in the longitudinal direction of the vehicle.

Figure 10:
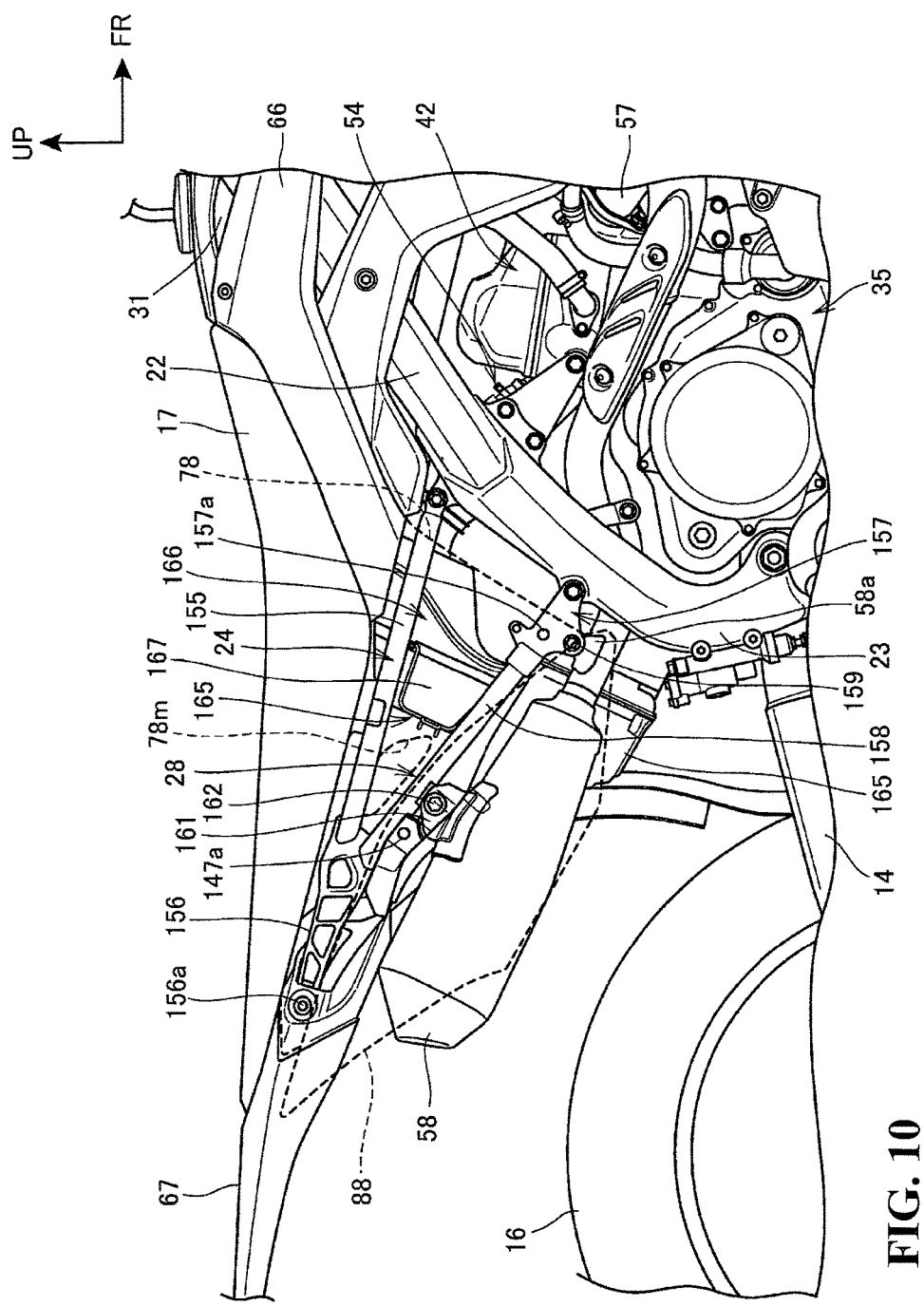
FIG. 10 is a right side view showing a state where the side cover is removed from the automobile in a state shown in FIG. 2.

FIG. 10 is a right side view showing a state where the side cover 63 is removed from the motorcycle 10 in a state shown in FIG. 2.

The seat frame 24 is constituted of a seat frame body 155 extending from the center frame 23 and an extension frame 156 mounted on a rear end portion of the seat frame body 155 as an extension of the seat frame body 155. A rear end portion of the sub frame 28 is mounted on a front end portion of the extension frame 156.

A threaded hole 156a is formed in a rear end portion of the extension frame 156. A front end portion of the rear fender 67 and a rear end portion of the upper side cover 78 are fixed to the extension frame 156 using a bolt 143 (see FIG. 2) which is threaded into the threaded hole 156a.

The sub frame 28 is constituted of a stay portion 157 mounted on the center frame 23 and a sub frame body 158 extending from a rear end portion of the stay portion 157 to the extension frame 156.

A threaded hole 157a into which the bolt 141 for fixing the front end portion lower portion of the upper side cover 78 and the front end projecting portion 88b (see FIG. 7(A)) of the lower side cover 88 is threaded, and a bolt insertion hole (not shown in the drawing) through which a bolt 159 for fixing an exhaust pipe stay 58a mounted on a rear end portion of the exhaust pipe 57 is made to pass are formed in the stay portion 157. A muffler stay 161 mounted on an upper portion of the muffler 58 is fixed to an intermediate portion of the sub frame body 158 by means of a bolt 162.

An air cleaner device 165 which constitutes the intake device 54 is arranged behind the cylinder portion 42 of the engine 35 and inside the seat frame 24 and the sub frame 28 in the vehicle width direction in a state where the air cleaner device 165 overlaps with the seat frame 24 and the sub frame 28 as viewed in a side view.

The air cleaner device 165 includes an air cleaner case 166 and an air cleaner element 167. A bolt insertion hole 147c is formed in the air cleaner case 166, and the bolt 142 (see FIG. 2) is made to pass through the bolt insertion hole 147c and a distal end portion of the bolt 142 is threadedly joined to a nut not shown in the drawing so that the lower side cover 88 is fixed to the air cleaner case 166.

Figure 11:
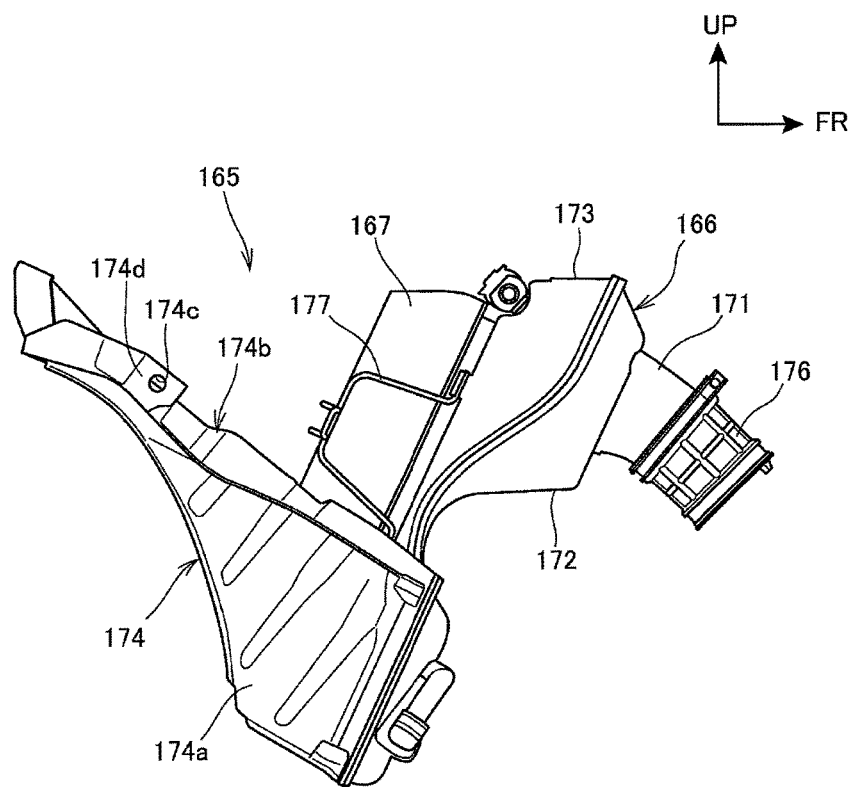
FIG. 11 is a right side view showing an air cleaner device and the constitution around the air cleaner device.

FIG. 11 is a right side view showing the air cleaner device 165 and the configuration around the air cleaner device 165.

The air cleaner device 165 includes an air cleaner case 166 and an air cleaner element 167 which is detachably mounted on the air cleaner case 166.

The air cleaner case 166 includes a front case 172 connected to a rear end portion of a connecting tube 171; a rear case 173 mounted on a rear portion of the front case 172 for holding the air cleaner element 167; and a lower case 174 which constitutes a lower portion of the air cleaner case 166.

The connecting tube 171 is connected to a throttle body (not shown in the drawing) by way of a connecting tube 176, and the throttle body is connected to the cylinder head 53 (see FIG. 2) by way of an intake pipe (not shown in the drawing).

A wire-like holding fitting 177 for holding the air cleaner element 167 is mounted on the rear case 173.

The lower case 174 is mounted on a lower end portion of the front case 172, and includes a pair of left and right side walls 174a and a pair of left and right side portion upper edge portions 174b.

The side wall 174a extends obliquely rearwardly and upwardly from a lower end portion of the front case 172 and covers a lower portion of the air cleaner element 167 from the side. The left and right side walls 174a are connected to each other by a bottom wall (not shown in the drawing), and the bottom wall covers the air cleaner element 167 from below. The side portion upper edge portion 174b is a portion further extending upwardly from an upper edge portion of the side wall 174a, and a bolt insertion hole 174c is formed in a rear portion of the side portion upper edge portion 174b.

The air cleaner element 167 is an externally mounting filter. Air filtered by the air cleaner element 167 is supplied to the engine 35 (see FIG. 1) through the intake device 54 (see FIG. 2) including the air cleaner case 166.

As shown in FIG. 10, the air introducing opening 78m formed in the upper side cover 78 is directed to a rear side of the air cleaner element 167 as viewed in a side view. Accordingly, muddy water and soil dust mixed into air are minimally directly caught by the air cleaner element 167. Thus, it is possible to essentially prevent the air cleaner element 167 from become dirty. Accordingly, the cleaning interval of the maintenance of the air cleaner element 167 can be extended.

Figure 12:
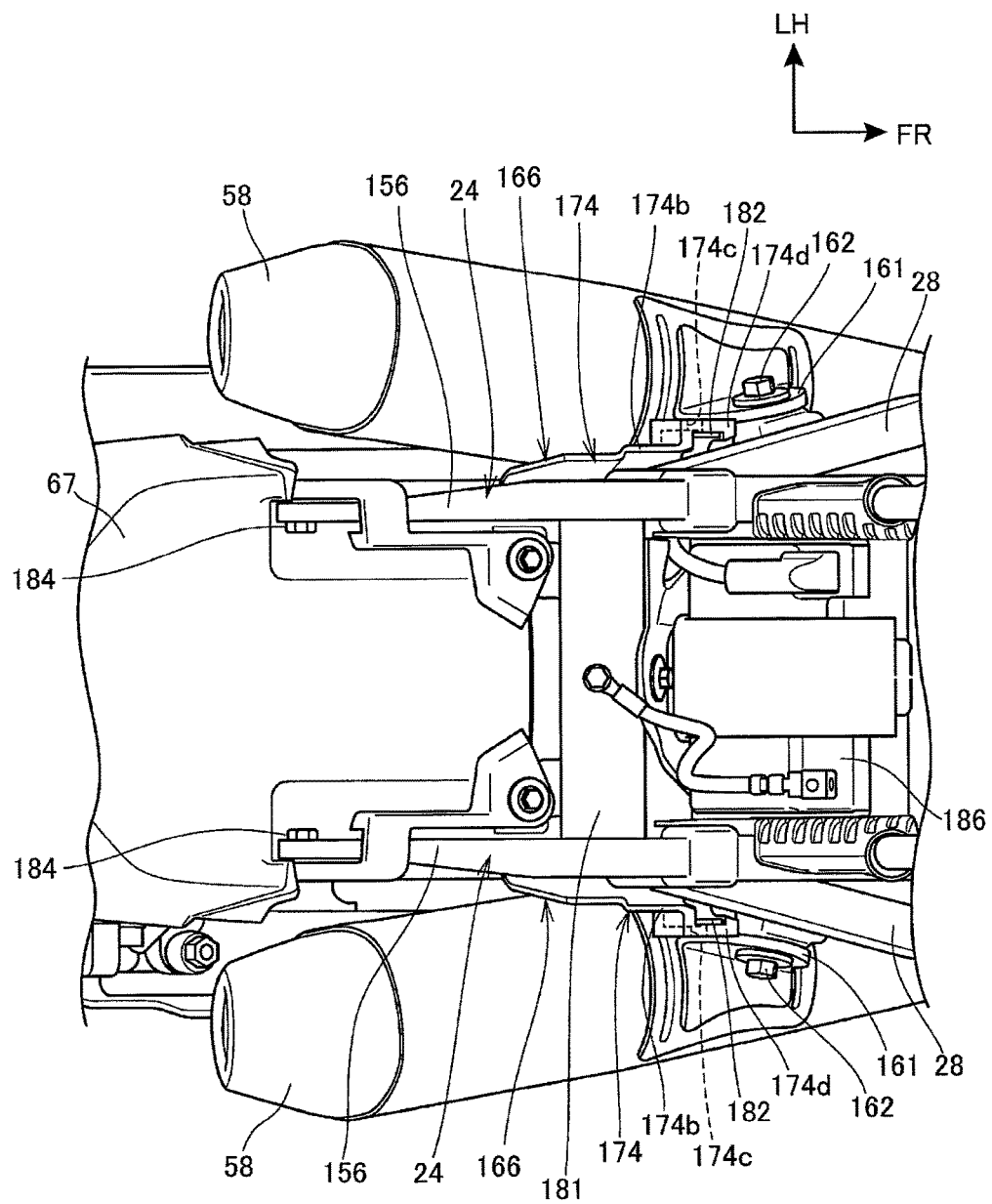
FIG. 12 is a plan view showing a state where a seat and the side cover are removed from the motorcycle in a state shown in FIG. 3.

FIG. 12 is a plan view showing a state where the seat 17 and the side cover 63 are removed from the motorcycle 10 in a state shown in FIG. 3.

The extension frames 156, 156 of the left and right seat frames 24, 24 are connected to each other by a cross frame 181 which extend in the vehicle width direction.

The side portion upper edge portions 174b of the lower case 174 of the air cleaner case 166 are arranged, respectively, on outer sides of the extension frames 156, 156 in the vehicle width direction. The bolt insertion hole 174c is formed in a sidewardly projecting portion 174d which is formed on the side portion upper edge portion 174b in an outwardly projecting manner. The bolt 142 (see FIG. 2) is made to pass through the bolt insertion hole 174c, and a distal end portion of the bolt 142 is threadedly joined to a nut 182 arranged inside the sidewardly projecting portion 174d in the vehicle width direction.

The bolt 143 (see FIG. 2) is threadedly joined to a nut 184 which is disposed inside in the vehicle width direction of the extension frame 156. A battery 186 is arranged in front of the cross frame 181 between the left and right seat frames 24, 24.

In FIGS. 2, 3 and 12, the lower cover mounting portion 89d of the lower side cover 88 is disposed further outside in the vehicle width direction relative to the upper cover mounting portion 78v of the upper side cover 78 so that the nut 182 into which the bolt 142 is threaded is disposed further outside in the vehicle width direction than the nut 184 into which the bolt 143 is threaded.

As shown in the above-described FIGS. 1, and 9(B) to FIG. 9(D), in the motorcycle 10 which is a saddle-ride-type vehicle including the side cover 63 which has the upper side cover 78 as first cover member and the lower side cover 88 as the second cover member in a state where the end portion of the upper side cover 78 and the end portion of the lower side cover 88 overlap with each other, the side cover 63 has the joining portion 63c formed by making the upper side cover 78 overlap with the outer side of the lower side cover 88, and the holding portion 63a formed by making the lower side cover 88 overlap with the outer side of the upper side cover 78, and the fixing portion 63b where the upper side cover 78 and the lower side cover 88 are made to overlap with each other in the same overlapping state as the joining portion 63c is disposed in the vicinity of the joining portion 63c.

The fixing portion 63b disposed in the vicinity of the joining portion 63c is fixed using a joining force generated in the joining portion 63c, and the upper side cover 78 can be held by making use of a holding force generated by the joining portion 63c and the fixing portion 63b at the holding portion 63a. Thus, in the holding portion 63a, the upper side cover 78 and the lower side cover 88 can be fixed to each other without joining the upper side cover 78 and the lower side cover 88 to each other.

Accordingly, the upper side cover 78 and the lower side cover 88 can be assembled with high accuracy while improving assembling property with the simple structure. As a result, a gap is minimally formed between the upper side cover 78 and the lower side cover 88 and hence, the external appearance of the side cover 63 can be enhanced.

Further, the joining portion 63c is provided to one longitudinal end portion of the upper side cover 78 and one longitudinal end portion of the lower side cover 88, and the holding portion 63a is provided to the other longitudinal end portion of the upper side cover 78 and the other longitudinal end portion of the lower side cover 88. Accordingly, the joining portion 63c and the holding portion 63a are provided to both end portions of the upper side cover 78 and the lower side cover 88 to be joined to each other. Thus, a joining strength between the upper side cover 78 and the lower side cover 88 can be enhanced.

Further, as shown in FIGS. 7(A) and 9(B), the lower side cover 88 has the lower cover mounting portion 89d as the mounting portion for the vehicle body, and the lower cover mounting portion 89d of the lower side cover 88 is disposed in the vicinity of the holding portion 63a. Accordingly, the holding portion 63a of the side cover 63 can be pressed to a vehicle body side by making use of a force for mounting the side cover 63 to the vehicle body. Thus, a holding force for holding the upper side cover 78 can be increased.

As shown in FIGS. 2, 5, 7(A) and 12, the upper side cover 78 has the upper cover mounting portion 78v as the mounting portion for the vehicle body, the lower side cover 88 has the lower cover mounting portion 89d as the mounting portion for the vehicle body, and the lower cover mounting portion 89d of the lower side cover 88 is disposed further outside in a vehicle width direction relative to the positioning of the upper cover mounting portion 78v of the upper side cover 78. Accordingly, in mounting the lower side cover 88 on the vehicle body at the lower cover mounting portion 89d, the lower cover mounting portion 89d of the lower side cover 88 can be fastened while taking into account a moving amount generated along with a fastening amount of the upper cover mounting portion 78v of the upper side cover 78. Thus, the formation of a gap between the upper side cover 78 and the lower side cover 88 can be suppressed.

As shown in FIGS. 2 and 9(B), the joining portion 63c is disposed in the vicinity of the imaginary line 190 for connecting the seat 17 and the step 87 for a rider which constitutes a step to each other. Accordingly, a joining strength of a portion of the side cover 63 with which a leg portion of a rider is brought into contact can be increased.

As shown in FIG. 2, the outer surface of the joining portion 63c is formed of a continuous surface. Thus, the side cover 63 does not obstruct the movement of a leg portion of a rider whereby the rider can smoothly change a riding posture.

As shown in FIGS. 3 and 9(B), the holding portion 63a is configured such that a width of the holding portion 63a is increased as viewed in a plan view as the holding portion 63a extends toward a rear side in the longitudinal direction of the vehicle. Accordingly, a modulus of section of the holding portion 63a is increased as the holding portion 63a extends to a rear side in the longitudinal direction of the vehicle. Thus, it is possible to compensate for a holding force which is lowered as the holding portion 63a is spaced apart from the fixing portion 63b.

Further, as shown in FIGS. 5, 10 and 11, the air introducing opening 78m is formed in the upper side cover 78, the air cleaner element 167 is disposed in the inside of the vehicle body which communicates with the air introducing opening 78*m*, and the air introducing opening 78*m* is directed toward a rear side of the air cleaner element 167. Accordingly, it is possible to suppress muddy water, soil, dust or the like which is mixed into air taken into the inside of the side cover 63 through the air introducing opening 78*m* from being caught by the air cleaner element 167, and also air can be supplied to the rear side of the air cleaner element 167 and hence, suction efficiency of the air cleaner device 165 can be enhanced.

The above-mentioned embodiment merely shows one mode to which the invention is applied, and various modifications and applications are conceivable as desired without departing from the gist of the invention.

The invention is applicable not only to the motorcycle 10 but also to saddle-ride-type vehicles other than the motorcycle 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle including a side cover having a first cover member and a second cover member in a state wherein an end portion of the first cover member and an end portion of the second cover member fit each other, comprising:

said first cover having a lower forward portion having a projecting ridge and an upper rearwardly extending portion having a rear groove;

said second cover having a lower forward portion having an upper edge groove and an upper rearwardly extending portion having an upper edge;

a joining portion formed by a first cover joining portion formed on the lower forward portion of the first cover member fitting with a second cover joining portion formed on an outer side of the lower forward portion of the second cover member;

a holding portion formed by the upper rearwardly extending portion of the second cover member and an outer side of the upper rearwardly extending portion of the first cover member; and a fixing portion formed by making the first cover fit with the outer part of the second cover, an outer surface of the first cover being flush with an outer surface of the second cover, wherein when the first cover member and the second cover member are rotated relative to each other to fit with each other, the first cover joining portion and the second cover joining portion are aligned relative to each other, the upper edge of the second cover member is inserted into the rear groove the first cover member to form the holding portion and the projecting ridge portion of the first cover is inserted into the upper edge groove of the second cover to form the fixing portion for securing the first cover and the second cover relative to each other, and wherein the fixing portion and joining portion are on a side of a rotation point opposite the holding portion.

2. The saddle-ride vehicle according to claim 1, wherein the joining portion is provided to one longitudinal end portion of the first cover member and one longitudinal end portion of the second cover member, and the holding portion is provided to the other longitudinal end portion of the first cover member and the other longitudinal end portion of the second cover member.

3. The saddle-ride vehicle according to claim 1, wherein the second cover member has a mounting portion for a vehicle body, and the mounting portion of the second cover member is disposed in the vicinity of the holding portion.

4. The saddle-ride vehicle according to claim 2, wherein the second cover member has a mounting portion for a vehicle body, and the mounting portion of the second cover member is disposed in the vicinity of the holding portion.

5. The saddle-ride vehicle according to claim 1, wherein the first cover member has a mounting portion for a vehicle body, the second cover member has a mounting portion for the vehicle body, and the mounting portion of the second cover member is disposed further outside in a vehicle width direction relative to a position of the mounting portion of the first cover member.

6. The saddle-ride vehicle according to claim 2, wherein the first cover member has a mounting portion for a vehicle body, the second cover member has a mounting portion for the vehicle body, and the mounting portion of the second cover member is disposed further outside in a vehicle width direction relative to a position of the mounting portion of the first cover member.

7. The saddle-ride vehicle according to claim 3, wherein the first cover member has a mounting portion for a vehicle body, the second cover member has a mounting portion for the vehicle body, and the mounting portion of the second cover member is disposed further outside in a vehicle width direction relative to a position of the mounting portion of the first cover member.

8. The saddle-ride vehicle according to claim 1, wherein the joining portion is disposed in the vicinity of an imaginary line which connects a seat and a step to each other.

9. The saddle-ride vehicle according to claim 2, wherein the joining portion is disposed in the vicinity of an imaginary line which connects a seat and a step to each other.

10. The saddle-ride vehicle according to claim 1, wherein an outer surface of the joining portion is formed of a continuous surface.

11. The saddle-ride vehicle according to claim 2, wherein an outer surface of the joining portion is formed of a continuous surface.

12. The saddle-ride vehicle according to claim 1, wherein the holding portion is configured such that a width of the holding portion is increased as the holding portion extends toward a rear side in the longitudinal direction of the vehicle as viewed in a plan view.

13. The saddle-ride vehicle according to claim 2, wherein the holding portion is configured such that a width of the holding portion is increased as the holding portion extends toward a rear side in the longitudinal direction of the vehicle as viewed in a plan view.

14. The saddle-ride vehicle according to claim 1, wherein an air introducing opening is formed in the first cover member, an air cleaner element is disposed in the inside of a vehicle body which communicates with the air introducing opening, and the air introducing opening is directed toward a rear side of the air cleaner element.

15. The saddle-ride vehicle according to claim 2, wherein an air introducing opening is formed in the first cover member, an air cleaner element is disposed in the inside of a vehicle body which communicates with the air introducing opening, and the air introducing opening is directed toward a rear side of the air cleaner element.

16. A side cover for a saddle-ride vehicle comprising:

a first cover member having a lower forward portion having a projecting ridge and an upper rearwardly extending portion having a rear groove;

a second cover member having a lower forward portion having an upper edge groove and an upper rearwardly extending portion having an upper edge, an end portion of the first cover member and an end portion of the second cover member fit with each other;

a joining portion formed by a first cover joining portion formed on the lower forward portion of the first cover member fitting with a second cover joining portion formed on an outer side of the lower forward portion of the second cover member;

a holding portion formed by the upper rearwardly extending portion of the second cover member and an outer side of the upper rearwardly extending portion of the first cover member; and a fixing portion formed by making the first cover fit with the outer part of the second cover, an outer surface of the first cover being flush with an outer surface of the second cover, wherein when the first cover member and the second cover member are rotated relative to each other to fit with each other, the first cover joining portion and the second cover joining portion are aligned relative to each other, the upper edge of the second cover member is inserted into the rear groove the first cover member to form the holding portion and the projecting ridge portion of the first cover is inserted into the upper edge groove of the second cover to form the fixing portion for securing the first cover and the second cover relative to each other, and wherein the fixing portion and joining portion are on a side of a rotation point opposite the holding portion.

17. The side cover for a saddle-ride vehicle according to claim 16, wherein the joining portion is provided to one longitudinal end portion of the first cover member and one longitudinal end portion of the second cover member, and the holding portion is provided to the other longitudinal end portion of the first cover member and the other longitudinal end portion of the second cover member.

18. The side cover for a saddle-ride vehicle according to claim 16, wherein the second cover member has a mounting portion for a vehicle body, and the mounting portion of the second cover member is disposed in the vicinity of the holding portion.

19. The side cover for a saddle-ride vehicle according to claim 16, wherein the first cover member has a mounting portion for a vehicle body, the second cover member has a mounting portion for the vehicle body, and the mounting portion of the second cover member is disposed further outside in a vehicle width direction relative to a position of the mounting portion of the first cover member.

20. The side cover for a saddle-ride vehicle according to claim 16, wherein the joining portion is disposed in the vicinity of an imaginary line which connects a seat and a step to each other.

* * * * *